INVENTOR.
HOWARD W. APPLEGATE

BY *Harry A. Herbert Jr*

ATTORNEYS

United States Patent Office 3,424,413
Patented Jan. 28, 1969

3,424,413
ADJUSTABLE SUPPORT
Howard W. Applegate, Westbury, N.Y., assignor to Bulova Watch Company, Inc.
Filed May 26, 1967, Ser. No. 643,024
U.S. Cl. 248—23                 3 Claims
Int. Cl. F16m 11/14

ABSTRACT OF THE DISCLOSURE

A platform capable of angular adjustment with respect to its supporting base by virtue of adjustment in any one or a combination of three supporting posts having fixed positions with respect to the base. The supporting posts elevate from the base and attach to the mount by three spherical type (swiveling) bearings. Two of the swivel bearings allow lateral movement of the race block in a direction toward or away from the third which has the relationship of the vertex of a right triangle described on the mount with the movable blocks located on its legs.

---

The invention relates to a supporting device for optical components or mechanical assemblies which permits angular adjustment without introducing strain into the mount or component to be adjusted.

A tiltable platform is mounted on a base and supported at three locations. At each location, a screw provides means for elevating the platform. At each location a bearing is provided in the platform, and at two of these locations the bearing is slidable toward the third which is stationary. Lines joining the three locations describe a right triangle, with the stationary bearing at its apex, and the movable bearings moving along the lines of the legs.

The object of the invention is the provision of a device for facilitating gross or minute angular adjustments of optical components or mechanical assemblies without introducing strain into the mount or component to be adjusted.

A further object of the invention is the provision of a tiltable platform, as indicated above, supported on a base by three posts whose positions on the base are fixed and bear the relationship to each other of describing a right triangle, and wherein the platform and post connections are swivel bearings, two of which are movable within limits toward and away from the third which represents the vertex or apex of the right triangle described on the mount.

A still further object of this invention involves the provision of a supporting device which is easy to manufacture of conventional, currently available materials that lend themselves to standard mass production manufacturing techniques.

These and other advantages, features and objects of the invention will become more apparent from the following description taken in connection with the illustrative embodiment in the accompanying drawings, wherein.

Figure 1:
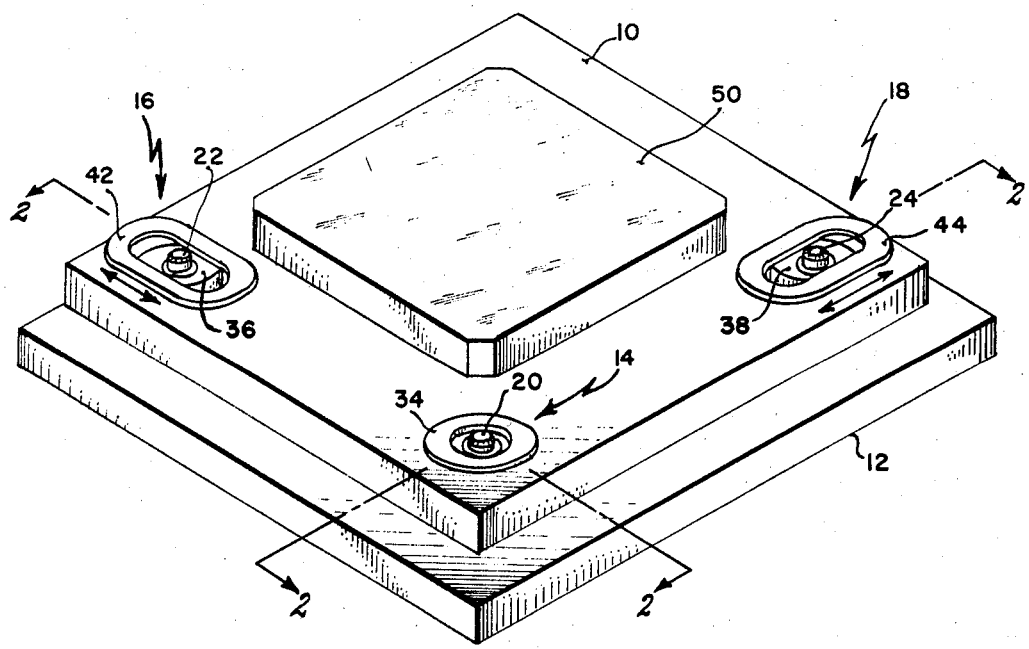
FIGURE 1 is a perspective view of the device.

Referring more in detail to the drawing, a tiltable platform or mount 10 is mounted on a base 12 at three locations. The mechanisms 14, 16 and 18 in each of these three locations, respectively, are all identical except for the method of their mounting. The common elements are: headed elevating posts or screws 20, 22, 24 mounted in threaded bores 23 in the base 12, swivel spherical bearings 26, 28, 30 mounted in the tiltable platform 10, and lock nuts 25, 27, 29, 31. The spherical bearings 26 and 28 are mounted in cylindrical race blocks, 36 and 38 seated in recesses, 46 and 48 which allow movement of the race blocks in direction toward and away from the mechanism at 14, as indicated by the arrowed lines on FIGURE 1. Of course, the race blocks would be manufactured in a conventional manner in order to facilitate assembly with the bearing. For example, the race blocks could be split and reassembled around the swivel bearings and joined by conventional means, such as screws.

Figure 2:
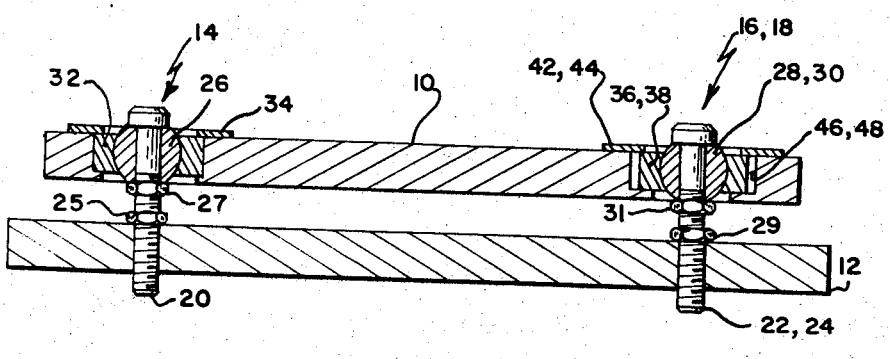
FIGURE 2 is a cross-section taken on either of the lines 2—2 in FIGURE 1, showing the movable member in level position.
Figure 3:
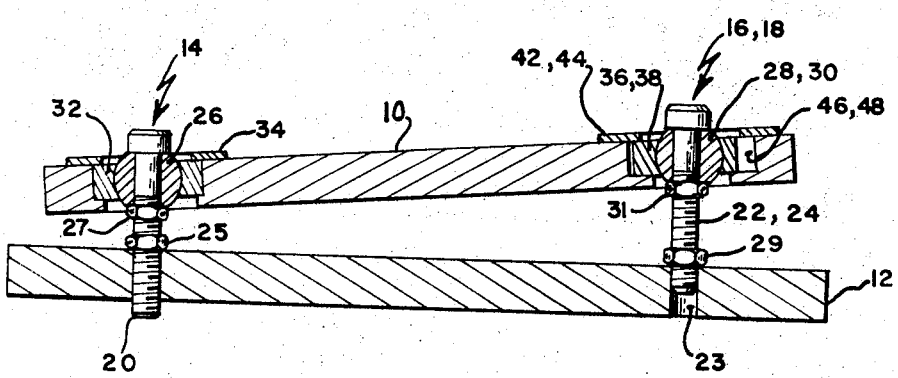
FIGURE 3 is a cross-sectional view similar to FIGURE 2, showing the movable platform in tilted position.

Referring to FIGURES 2 and 3, the cylindrical race block 32 of the spherical bearing 26 is captured in a recess in the movable platform 10 by the ring-shaped keeper 34, which is secured to the platform in any conventional manner, such as screws or welding, while the race blocks 36 and 38 of the spherical bearings 28 and 30 are captured by means of keepers 42 and 44, which may be elliptical in character. The keepers overlap at least a portion of the race blocks for their capture. Openings 46 and 48 in platform 10, which accommodate the bearing race blocks 36 and 38, are elongated to allow movement of the bearing blocks in a direction toward and away from the location at 14 and on lines at right angles to each other. The race blocks at 16 and 18 may be elongated to correspond to the shape of the keepers 42 and 44, if desired, in order to avoid a turning action during adjustment.

At 14 there is no movement of the race block 32 in its opening. There is only swiveling movement about the bearing 26 to allow tilting of the mount 10. As indicated in FIGURE 3, as the platform 10 tilts, the blocks 34 and 36, constituting the outer races of the bearings 28 and 30, can move in the openings 46 and 48 in a direction at right angles to each other and toward or away from the location at 14 to lengthen or shorten the legs of the triangle, described upon the mount or platform.

Turning any of the elevating screws 20, 22 and 24 will increase or decrease the space between the platform 10 and the base 12, and angular adjustments can be accomplished by selective operation of the individual screws. A mirror 50, or other component to be adjusted, can be mounted on the movable member 10.

Thus, there has been described a kinematic mount which could utilize similar mechanisms, if desired, for effecting adjustment without introducing a strain on the mount or component mounted thereon.

Although the invention has been described with reference to a particular embodiment, it will be understood to those skilled in the art that the invention is capable of a variety of alternative embodiments within the spirit and scope of the appended claims.

I claim:

1. A mount for optical instrumentation and the like comprising a base, a platform mounted on said base for angular adjustment with reference to said base, means for mounting said platform on said base, said means comprising three elevating posts rising from said base at three fixed positions on said base, and capable of elevating movement with respect to said base, a spherical bearing forming a connection between said platform and each of said posts, two of said bearings being slidable within limits toward and away from the third to allow angular adjustment of said platform with respect to said base, the location of the three fixed positions on the base bearing the relationship of the apex and corners of a right triangle, the location of the three spherical bearings on the platform bearing the relationship to each other of the apex and points on the legs of a right triangle described upon the platform, the movement of the two movable bearings being along the legs within limits toward and away from the apex.

2. A mount, as defined in claim 1, including bearing races for mounting said spherical bearings, an opening in said platform, for accommodating and providing a race for the bearing which is not slidable, and openings elongated in the direction of the legs of said right triangle in said platform for receiving said bearings which are slidable.

3. A mount, as defined in claim 2, including means for maintaining said races within said openings and means for locking said elevating posts in position.

References Cited

UNITED STATES PATENTS

| | | | |
|---|---|---|---|
| 1,355,429 | 10/1920 | Sabins et al. | 248—188.4 |
| 1,863,309 | 6/1932 | Kitts | 248—11 |
| 3,204,584 | 9/1965 | Mladjan | 108—143 |
| 3,239,169 | 3/1966 | Sloyan | 248—23 |

JOHN PETO, *Primary Examiner.*

U.S. Cl. X.R.

108—143; 248—188.4